United States Patent
Taine et al.

(10) Patent No.: US 10,182,204 B1
(45) Date of Patent: Jan. 15, 2019

(54) GENERATING IMAGES OF VIDEO CHAT SESSIONS

(71) Applicant: Facebook, Inc., Menlo Park, CA (US)

(72) Inventors: Stephane Taine, Issaquah, WA (US); Nora Micheva, Seattle, WA (US); Shyamalan Pather, Seattle, WA (US); Jason Duane Clark, Woodinville, WA (US); Michelle Ruby Hwang, Seattle, WA (US); Hoang Le, Seattle, WA (US); Joel Alexander Bullard, Seattle, WA (US); Candace Button Disco, Seattle, WA (US); Joseph Stephen Gonzalez, Seattle, WA (US); Kelly Nicole Stevens, Seattle, WA (US); Anne Raynor, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/815,633

(22) Filed: Nov. 16, 2017

(51) Int. Cl.
  *H04N 7/14* (2006.01)
  *H04N 5/445* (2011.01)
  *G06F 3/0484* (2013.01)
  *H04L 29/06* (2006.01)

(52) U.S. Cl.
  CPC ......... *H04N 7/147* (2013.01); *G06F 3/04842* (2013.01); *H04N 5/44504* (2013.01); *H04L 65/403* (2013.01); *H04L 67/42* (2013.01)

(58) Field of Classification Search
  CPC . H04N 7/15; H04N 7/14; H04N 7/147; H04L 65/403
  USPC ............ 348/14.01–14.16; 715/753; 709/204
  See application file for complete search history.

(56) References Cited

U.S. PATENT DOCUMENTS

| | | | |
|---|---|---|---|
| 9,661,264 B2 * | 5/2017 | Tamiya | H04N 5/23222 |
| 2013/0106988 A1 * | 5/2013 | Davis | H04N 7/15 348/14.09 |
| 2014/0210939 A1 * | 7/2014 | Mock | H04N 7/152 348/14.03 |
| 2016/0134835 A1 * | 5/2016 | Desai | H04N 7/141 348/14.02 |

OTHER PUBLICATIONS

Constine, J., "Facebook Messenger Launches 6-screen Group Video Chat with Selfie Masks," Dec. 19, 2016, seven pages, [Online] [Retrieved on Jan. 2, 2018] Retrieved from the Internet <URL:https://techcrunch.com/2016/12/19/messenger-group-video-chat/>.

* cited by examiner

*Primary Examiner* — Melur Ramakrishnaiah
(74) *Attorney, Agent, or Firm* — Fenwick & West LLP

(57) ABSTRACT

Users of multiple clients participate in a video chat session by exchanging video streams. A user initiates generation of a high-quality composite image of the video chat session. The clients each capture high-quality local images and send the images to a chat server via a communications channel that is out-of-band from the video streams. The chat server stores the images in a repository. The initiating user views the images and selects images and a layout to use for the composite image. The chat server assembles the composite image based on the selections and saves the composite image to the repository. The initiating user can retrieve the composite image and view it, post it to social media, and/or use it for other purposes.

17 Claims, 5 Drawing Sheets

GENERATING IMAGES OF VIDEO CHAT SESSIONS

BACKGROUND

This disclosure relates generally to electronic communications, and more particularly to video chat and generating composite images based on video chat sessions.

Video chat has become commonplace. Users use clients such as mobile phones, tablets, and computers to participate in video chat sessions with one or more other participants. A video chat allows the participants to exchange both audio and video in real time. The participants' clients display the video and play the accompanying audio, allowing the participants to both see and hear each other.

A chat participant may wish to take a picture of the displayed video chat. That is, the participant may wish to capture a snapshot image of the video chat as it is displayed on the participant's client at a given moment in time. The picture serves to memorialize the gathering and can be shared on social media or used for other purposes. One way to generate a picture is to use functionality built into the client to capture an image of the current content displayed by the device. For example, the participant can press a button or button combination on the client to save the current display to an image file stored on the device.

However, images captured in this manner tend to be of poor quality. The video streams received from the remote chat participants often undergo compression and other processing. In addition, the streams may suffer network transmission errors. These streams appear to have high quality when viewed as a video. But the streams have noticeable artifacts that detract from the quality when viewed as still images. For example, the images of the other chat participants may appear blocky or blurred. These quality defects detract from the participants' video chat experience.

SUMMARY

The above and other issues are addressed by generating a composite image of a video chat that combines multiple images captured locally by clients of the chat participants. The local images are not subject to the processing and transmission errors that detract from the quality of images in the video. The composite image is therefore of higher quality relative to an image captured from the display of a client.

Users of multiple clients participate in a video chat session by exchanging video streams. The clients may provide streams to the chat server, and the chat server distributes the streams to the other clients. In addition, each client has an out-of-band communications channel with the chat server that is separate from the video streams.

A user of an initiating client initiates generation of a high-quality composite image of the video chat session. The initiating client sends an activity message to clients of other users participating in the chat session requesting that the users participate in the composite image generation process. The activity message requests that the clients capture high-quality local images. If the users agree to participate, the initiating client sends a second activity message instructing the other clients to capture the local images.

The clients each capture high-quality local images based on the activity message. The clients send the captured images to the chat server via the communications channels and the chat server stores the images in a repository. The chat server sends references to the images received from the clients to the initiating client and the initiating client uses the references to retrieve the images. A separate Upload Service may receive the images and send the image references in one embodiment. The user selects the images and the layout to use for the composite image and sends the selections to the chat server. The chat server assembles the composite image based on the selections and saves the composite image to the repository. The chat server then sends a reference to the composite image to the initiating user's client. In another embodiment, the initiating client assembles the composite image based on the selections and saves the composite image to the repository. The user of the initiating client can view the composite image, post it to social media, and/or use the image for other purposes.

The figures depict various embodiments of the present invention for the purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
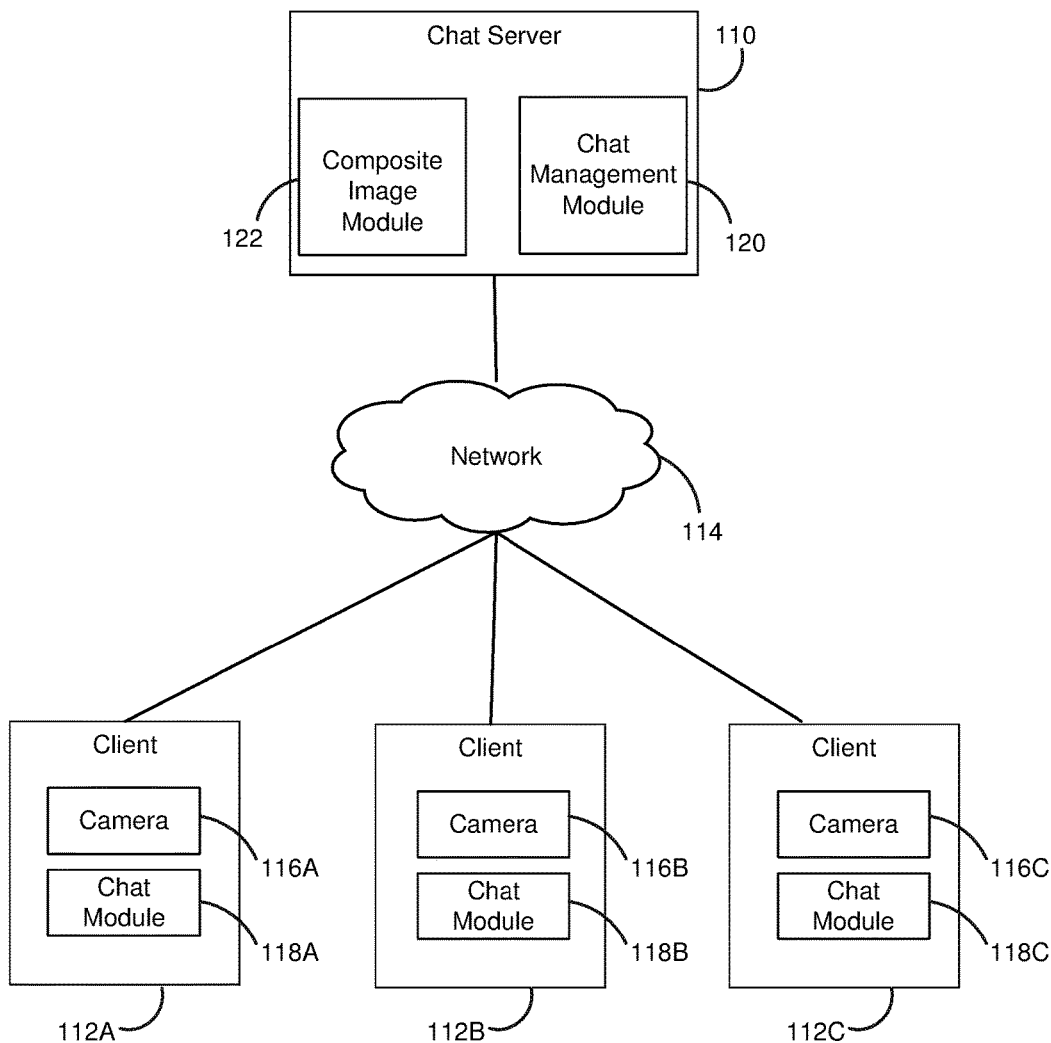
FIG. 1 is a high-level block diagram illustrating a system environment including an electronic chat server.

FIG. 1 is a high-level block diagram illustrating a system environment 100 including an electronic chat server 110. The environment 100 includes multiple clients 112 connected to the chat server 110 via a network 114. While only a few clients 112 and one chat server 110 are shown in FIG. 1, embodiments of the environment 100 can have many such entities connected to the network 114. Other components may also be connected to the network 114.

FIG. 1 uses like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral. For example, "112" in the text refers to reference numerals "112A," "112B," and/or "112C" in the figures.

A client 112 is a computing device that can transmit and/or receive data via the network 114. A user may use a client 112 to perform functions such as participating in video chat sessions with users of other clients, browsing websites hosted by web servers on the network 114, consuming digital content received via the network, and executing software applications. For example, the client 112 may be a smartphone or a tablet, notebook, or desktop computer. In addition, the client 112 may be an Internet-of-Things (IoT)-connected device such as a home appliance. The client 112 includes a display device that presents digital content, such as video streams associated with a video chat session.

In addition, the client 112 includes a camera 116 for capturing still images and video streams. The camera 112 can capture still images and video streams at one or more different quality levels. Different quality levels may be distinguished by having different characteristics including resolution, frame rate, bitrate, and/or compression rate. The camera 116 may capture still images at a higher quality level than it captures video images. The cameras 116 of different clients 112 are often different. Some clients 112 may have separate forward- and rear-facing cameras, separate still and video cameras, the ability to capture still images while capturing video using the same camera, etc. The client 112 also has a microphone that captures audio which may then be incorporated into the video stream.

The client 112 executes one or more applications ("apps") that extend the functionality of the client. The apps may include a web browser that allows the client 112 to interact with websites provided by servers connected to the network 114. The apps may also include one or more dedicated apps for accessing the chat server 110. In one embodiment, the user downloads and installs apps on the client 112 for specific purposes, such as engaging in video chats using the chat server 110. Alternatively, the functionality of an app may be incorporated into an operating system of the client 112 or included in other native functionality of the client.

The chat module 118 illustrated within the client 112 in FIG. 1 represents an app for interacting with the chat server 110 via the network 114. The chat module 118 enables a user of the client 110 to participate in video chats with one or more other client users (collectively called chat "participants"). In one embodiment, the user of the client 112 interacts with the chat module 118 to initiate a chat session with one or more other chat participants. The chat module 118 communicates with the chat server 110 to set up the video chat session and exchange video streams captured using the cameras 116 of the participants' clients 112. The chat module 118 may also allow the user to perform other actions, such as exchanging messages with the other users and/or engaging with an online system such as a social networking system.

The chat module 118 shows the video chat on the display device of the client 112. The video chat may be shown, for example, as a split screen layout having multiple discrete windows, with each window showing a video stream from an individual chat participant. One window shows the video stream being sent to the other participants from the client 112 while the other windows show video streams received from the other participants' clients. The video streams often show the faces of the chat participants, although a participant may choose to train the camera 116 on something else. The video streams received from the other chat participants often undergo video-specific compression and other processing that may detract from the quality of the images in the streams. In addition, the video streams may include errors introduced during transmission over the network 114.

The chat module 118 includes functionality allowing the user of the client 112 to capture a high-quality composite image of the video chat. Rather than merely taking a snapshot of the image of the video chat shown on the display of the client 112, the chat module 118 interacts with the chat modules of other clients 112 to cause the clients to capture and store high-quality local images. The local images may be captured from the video streams of the clients 112 before video-specific compression or other processing is applied, and/or captured as still images. The user interacts with the chat module 118 to assemble the captured local images into a composite image representing the video chat. The captured local images do not suffer from certain compression and other processing artifacts or transmission errors typically present in a video stream. Thus, the composite image formed by stitching together the captured local images is of higher quality than would be an image captured from a display showing the video chat.

The chat server 110 interacts with the clients 112 via the network 114 to provide video chat services and generate high-quality images of chat sessions. The chat server 110 is remote from the clients 112 and may be implemented using one or more dedicated computers and/or a cloud computing platform. The chat server 110 may be dedicated to providing video chat services, may provide additional services, or may be integrated into a platform that also provides other services. In the illustrated embodiment, the chat server includes a chat management module 120 and a composite image module 122. Other embodiments may include different or other modules, and may distribute functions among the modules in a different manner than described herein.

The chat management module 120 establishes and supports video chat sessions for users of the clients 112. The chat management module 120 interacts with the chat modules 118 of the clients 112 for this purpose. For example, the chat management module 120 may provide an application programming interface (API) accessible via the network 114 by which the chat modules 118 can initiate and maintain video chat sessions The chat management module 120 receives messages from chat modules 118 of users' clients 112 requesting to conduct video chats with users of other clients. The chat management module 120 relays these requests among the clients 112 and establishes video chat sessions if the requests are accepted.

For example, the chat management module 120 may receive a request from the user of client 112A to conduct a video chat with the users of clients 112B and 112C. In response to the request, the chat management module 120 sends video chat join requests to clients 112B and 112C. The users of these devices 112B, 112C interact with their respective chat modules 118B, 118C to either accept or decline to join the chat. Assuming at least one user joins, the chat management module 120 establishes a video chat session among the participating users.

The chat management module 120 establishes and supports video chat sessions by exchanging video streams (which may also contain audio) among the clients 112 of the chat participants. In one embodiment, the chat management module 120 receives local video streams from the participating clients 112 and distributes the streams among the clients according to the various chat sessions. The chat management module 120 may perform processing on the video streams, such as compressing the streams and/or combining streams from multiple participants into composite streams. In other embodiments, the video streams are distributed among the participating clients 112 in a peer-to-peer fashion without passing through the chat server 110. In one peer-to-peer embodiment the chat management module 120 negotiates and establishes the peer-to-peer connections on behalf of the clients 112. In another peer-to-peer embodiment, clients 112 establish the connections directly with other clients.

The composite image module 122 interacts with the chat modules 118 of the clients 112 to create high-quality composite images of video chat sessions. In one embodiment, the composite image module 122 receives an image capture request from an initiating client 112 participating in a chat session and distributes the request to the other participating clients. The requesting client 112, and the other clients that accept the request, capture high-quality local images using their local cameras 116 and send these images to the composite image module 122 via the network 114. A given client 112 may send one or more images in response to a request. In one embodiment, the clients 112 send the captured images out-of-band from the video chat session, without applying the processing performed on the video stream. The captured images received by the composite image module 122 are thus free of any processing artifacts and/or transmission errors that might be present in the video streams.

The composite image module 122 provides the images to the participant that requested the composite image. In addition, the composite image module 122 interacts with the requesting participant to select the images and layout for the composite image. The composite image module 122 then uses the selected images and layout to generate the composite image representing the chat session by stitching together the high-quality images received from the clients 112 according to the selected layout. For example, the composite image module 122 can assemble a composite image that matches the split screen windowed layout of the video chat session. In another embodiment, the chat module 118 generates the composite image locally on the client 112 in response to interactions with the composite image module 122.

In one embodiment, the network 114 uses standard communications technologies and/or protocols. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 115 may be represented using any suitable format, such as hypertext markup language (HTML) or extensible markup language (XML). In some embodiments, all or some of the communication links of the network 115 are encrypted using any suitable technique or techniques.

Figure 2:
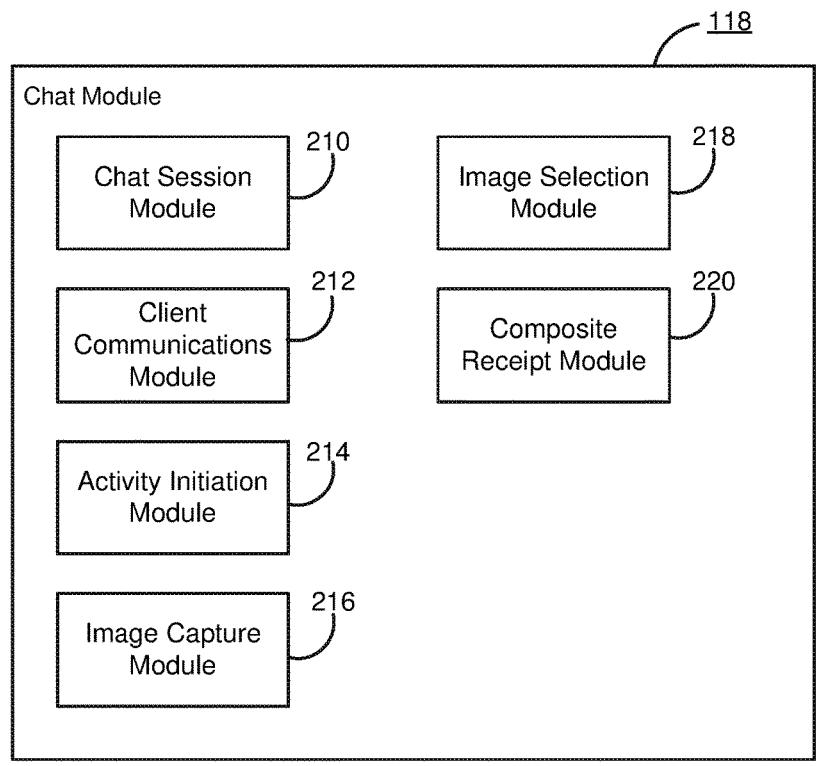
FIG. 2 is a block diagram showing additional details of the chat module of a client according to one embodiment.

FIG. 2 is a block diagram showing additional details of the chat module 118 according to one embodiment. The chat module 118 includes multiple other modules within it. Other embodiments of the chat module 118 may include different and/or additional modules than those described herein. In addition, the functions may be distributed among the modules in a different manner.

A chat session module 210 interacts with the chat server 110 to establish a video chat session. The chat session module 210 presents a user interface (UI) to the user using the display device of the client 112. The UI allows the user to send chat initiation requests to users of other clients 112. For example, the UI may allow a user to press an on-screen button to initiate a video chat request, and then select one or more other users to participate in the video chat. The chat session module 210 sends chat initiation requests to the selected users, either via the chat server 110 or directly. In addition, the chat session module 210 presents a UI allowing the user to respond to chat initiation requests received from other users. For example, the UI may display a dialog window announcing a chat initiation request from a particular user. The user can interact with the dialog window to accept or decline the request.

When client 112 joins a video chat, the chat session module 210 interacts with the chat server 110 to exchange video streams for the video chat. The chat session module 210 uses the camera 116 of the client 112 to capture a local video stream and provides this stream to the chat server 110. The chat session module 210 uses a video codec to process the local video stream before sending it to the chat server 110. The codec compresses the video stream and may introduce compression artifacts into the stream. Such artifacts may not be noticeable to an observer viewing the video stream as a sequence of changing frames but may be noticeable when individual frames are viewed in isolation. The chat session module 210 also receives one or more remote video streams from the chat server 110. The chat session module 210 decompresses the received video streams using the codec and displays the streams on the client 112.

A client communications module 212 maintains a communications channel with the chat server 110 via the network 114. This communications channel is out-of-band with the video streams exchanged with the server 110. In other words, the communication channel is logically separate from the video streams. The communications channel may be temporary and exist only when it is actively being used.

The communications channel is used to exchange information between the client 112 and the chat server 110. The exchanged information may include chat initiation requests and responses, other forms of requests and responses, metadata about a video chat session, high-quality images, etc. The communications channel may use conventional protocols to exchange information via the network 114, such as JavaScript Object Notation (JSON) or XML. The communications channel may also use proprietary protocols.

An activity initiation module 214 coordinates activities among the clients 112, such as capturing high-quality local images of chat participants in order to create a composite image. The activity initiation module 214 selectively sends activity messages to other clients 112 via the network 114. The messages may be sent through the communications channel and distributed by the chat server 110 or sent directly to the clients 112. An activity message indicates that the user of a client 112 is initiating an activity and requesting that users of other clients participate in the activity. The activity message identifies both the activity and the initiating user.

In one embodiment, the other clients 112 automatically engage in the activity if the respective users of those clients agree to participate. In another embodiment, the activity initiation module 214 receives responses from the other clients 112 indicating whether they will participate in the activity. The activity initiation module 214 presents the responses to the initiating user, and the user can then decide whether to proceed with the activity. Alternatively, the activity initiation module 214 can algorithmically decide whether to proceed. For example, the activity initiation module 214 can automatically proceed if a threshold number or percentage of other clients agree to participate in the activity. If the activity proceeds, the activity initiation module 214 sends messages to the participating clients 112 instructing the devices to perform the activity.

In addition, the activity initiation module 214 receives activity messages sent by other clients 112. Upon receiving an activity message, an embodiment of the activity initiation module 214 presents a UI to the user inquiring as to whether to perform the activity and sends a reply to the initiating user's client 112 indicating the user's response. In another embodiment, the activity initiation module 214 automatically determines whether to perform the activity and sends the reply without querying the user. For example, the activity initiation module 214 can evaluate the activity message in view of configuration settings or other state information at the client 112 to algorithmically determine whether to participate in the activity. The activity initiation module 214 may automatically perform the activity if the response indicates to proceed.

In practice, a participant in a video chat session uses the activity initiation module 214 to initiate generation of a high-quality composite image of the session. The initiating participant interacts with the activity initiation module 214 to send activity messages to other participants requesting that they participate in the composite image generation process. The initiating participant evaluates the responses and decides whether to generate the composite image. Assuming that the initiating participant decides to proceed, the activity initiation module 214 sends activity messages to the participating clients 112 instructing the devices to capture high-quality local images for the purpose of generating a composite image.

An image capture module 216 captures high-quality local images using the camera 116 of the client 112. The image capture module 216 may capture the local images in response to receiving activity messages sent by activity initiation modules 214 of clients 112. The activity messages may be received from the activity initiation module 214 executing on the same client as the image capture module 216 and received activity initiation modules 216 executing on remote clients 112. The images are said to be "local" because they are captured using the camera 116 of the client 112 rather than received from elsewhere.

An embodiment of the image capture module 216 captures the local images from the video chat stream being generated by the camera 116 of the client 112. Recall that the camera 116 is already active and capturing video when the capture instruction is received because the client 112 is being used for a video chat session. The image capture module 216 samples (captures) one or more images from frames of the video being output from the camera 116. Some cameras 116 include functionality for capturing a higher-quality still image while concurrently capturing a lower-quality video stream. If the client 112 has such a camera 116, the image capture module 216 may activate the still image functionality to capture an image. Additionally, some clients 112 include separate video and still cameras 116. In this case, the image capture module 216 may activate the still camera to capture an image.

The image capture module 216 may capture multiple images. For example, the image capture module 216 may capture a set of sequential images from the video stream. In one embodiment, the image capture module 216 presents the multiple images to the user of the client 112. The user may then select one or more of the captured images for potential inclusion in the composite image. In another embodiment, the image capture module 216 automatically selects one or more images from among the captured images. For example, the image capture module may use face and blink detection technologies to select images showing the participant with his or her eyes open.

Images captured by the image capture module 216 are of higher quality than the images in the video streams received by the clients 112 for the video chat session. Specifically, the captured images have enhanced characteristics in one or more of resolution and compression (with lower rate of compression indicating higher quality). The captured images may have additional enhanced characteristics in areas such as color depth, bit rate, and light sensitivity. The captured images are of higher quality because the images are captured before video-specific compression or other processing is performed on the images to render the images suitable for use in the video chat and/or the images are captured using the still image functionality of the camera 116. Likewise, the images do not include any artifacts introduced by network transmission errors.

The image capture module 216 sends captured images to the chat server 110 via the network 114. In one embodiment, the image capture module 216 interacts with the client communications module 212 to send the captured images via the communications channel. For example, upon capturing a high-quality local image in response to an activity messages, the image capture module 216 may send the captured image to the chat server 110 via the communications channel provided by the client communications module 212.

An image selection module 218 interacts with the client 112 of the initiating participant to select the images and layout for the composite image. The image selection module 218 interacts with the chat server 110 via the communications channel provided by the client communications module 212 to receive the local images captured by the clients 112 used in a video chat session. In one embodiment, the image selection module 218 receives references to storage locations of the images and uses the references to fetch the images. The storage locations may be at the chat server 110 or elsewhere on the network 114.

The image selection module 218 presents the images to the participant and receives image selections from the participant in response. For example, the image selection module 218 displays one or more images from each chat participant on the display device of the client 112. In addition, the image selection module 218 provides UI controls that the participant uses to select the images to include in the composite image. In another embodiment, the image selection module 218 automatically selects the images for inclusion in the composite image.

The image selection module 218 also presents one or more layouts to the participant and receives a layout selection in response. The layout describes the organization of the high-quality images within the composite image. That is, the layout describes the locations and sizes of the images comprising the composite image. In addition, the layout may describe graphical effects, to be included in the composite image. The participant may select the layout by choosing from one or more layout templates provided by the image selection module 218. For example, the layout may specify that the composite image is to have images of the chat participants arranged in a grid pattern, and have a background with images of a particular theme (e.g., a "party" background with balloons and confetti). The image selection module 218 provides references to the selected images and a description of the layout to the chat server 110 using the communications channel.

A composite receipt module 220 receives the high-quality composite image from the chat server 110. The composite receipt module 220 receives the composite image via the communications channel maintained by the client communications module 212. The requesting participant can then view and use the composite image. For example, the participant can post the composite image to social media, send it to other participants, or save it for future use. Alternatively, or in addition to the operations described above, the composite receipt module 220 generates the composite image on the client 112 using the references to the selected images and the description of the layout selected by the participant. The composite receipt module 220 provides the generated composite image to the composite image module 122 of the chat server 110, and receives a reference to the composite image in return.

Figure 3:
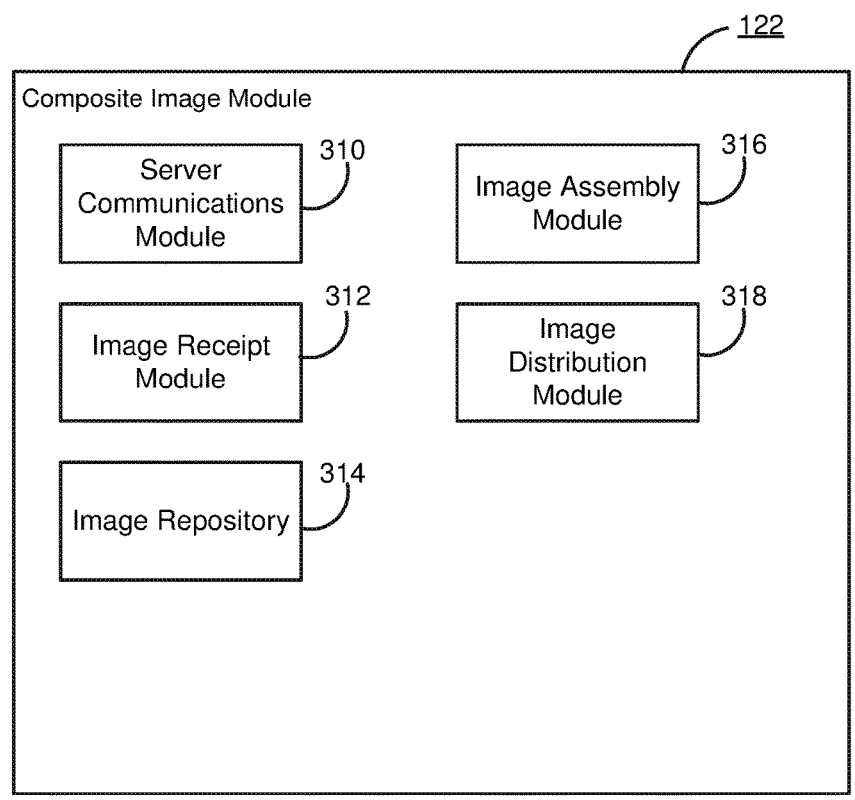
FIG. 3 is a block diagram showing additional details of the composite image module of the chat server according to one embodiment.

FIG. 3 is a block diagram showing additional details of the composite image module 122 of the chat server 110 according to one embodiment. The composite image module 122 includes multiple other modules within it. Other embodiments of the composite image module 122 may include different and/or additional modules than those described herein. In addition, the functions may be distributed among the modules in a different manner.

A server communications module 310 maintains communications channels with the clients 112 via the network 114. The server communications module 310 is the counterpart to the client communications modules 212 of the clients 112. As such, the server communications module 310 provides server-side support for the communications channel used to exchange information between the chat server 110 and the clients 112. In one embodiment, the server communications module 310 receives an activity message from an initiating client and relays the message to the other clients.

An image receipt module 312 receives high-quality local images from the clients 112 and stores the images in an image repository 314. The image receipt module 312 specifically receives the high-quality local images captured by the clients 112 in response to activity messages. These images are received via the communications channels maintained by the server communications module 310.

The image repository 314 is a database or other data structure supporting the storage and retrieval of images and other information. In one embodiment, the image repository 314 stores images at locations specified by image references. Each image has an associated reference, and the image can be accessed by supplying the reference to the image repository 314. Depending upon the embodiment, the image repository 314 can store given images in perpetuity or for a limited time. For example, the image repository 314 can delete local images after the images are incorporated into a composite image.

In one embodiment, the image receipt module 312 and image repository 314 are maintained by a server and/or service that is logically separate from the chat server 110 and the other modules within the composite image module 122. For example, the image receipt module 312 and image repository 314 may by maintained by a separate Upload Service that provides temporary storage for images and other information received from clients 112. In this embodiment, the clients 112 and modules within the composite image module 122 interact with the Upload Service to store and access the local images.

An image assembly module 316 generates high-quality composite images using images stored in the image repository 314. The image assembly module 316 interacts with the client 112 of the chat participant that initiated the composite image generation process. The image assembly module 316 sends the initiating client 112 the image references for the high-quality images from the chat session stored in the image repository 314. The initiating client 112 uses the references to retrieve the images, and a user of that client selects from among the images. In response, the image assembly module 316 receives image and layout selections for the composite image.

The image assembly module 316 uses the image and layout selections to generate the composite image. To this end, the module 316 combines the selected images using the specified layout to form a single composite image. For example, the image assembly module may crop or scale down the high-quality images to form smaller images, then combine the smaller images using the layout to produce a composite images showing the chat participants arranged as they were in the chat. In addition, the image assembly module 316 may apply background images and/or perform image processing on the composite image according to the layout. The result of this processing is a composite image showing high-quality pictures of the chat participants arranged according to the selected layout. The image assembly module 316 saves the composite image to the image repository 314.

An image distribution module 318 provides the high-quality composite image to the client 112 of the chat participant that initiated the composite image generation process. In one embodiment, the image distribution module 318 provides the reference to the composite image in the image repository 314 to the client 112. The user of the client 112 can use the reference to obtain and use the image. The user can also send the image to the other participants by forwarding the reference using an activity message.

As mentioned above, in one embodiment the composite image is assembled by the chat module 118 of the client 112. In this instance, operations ascribed above to the image assembly module 316 are instead performed by the chat module 118. In addition, the image distribution module 318 receives the generated composite image from the client 112 and stores the image in the image repository 314.

Figure 4:
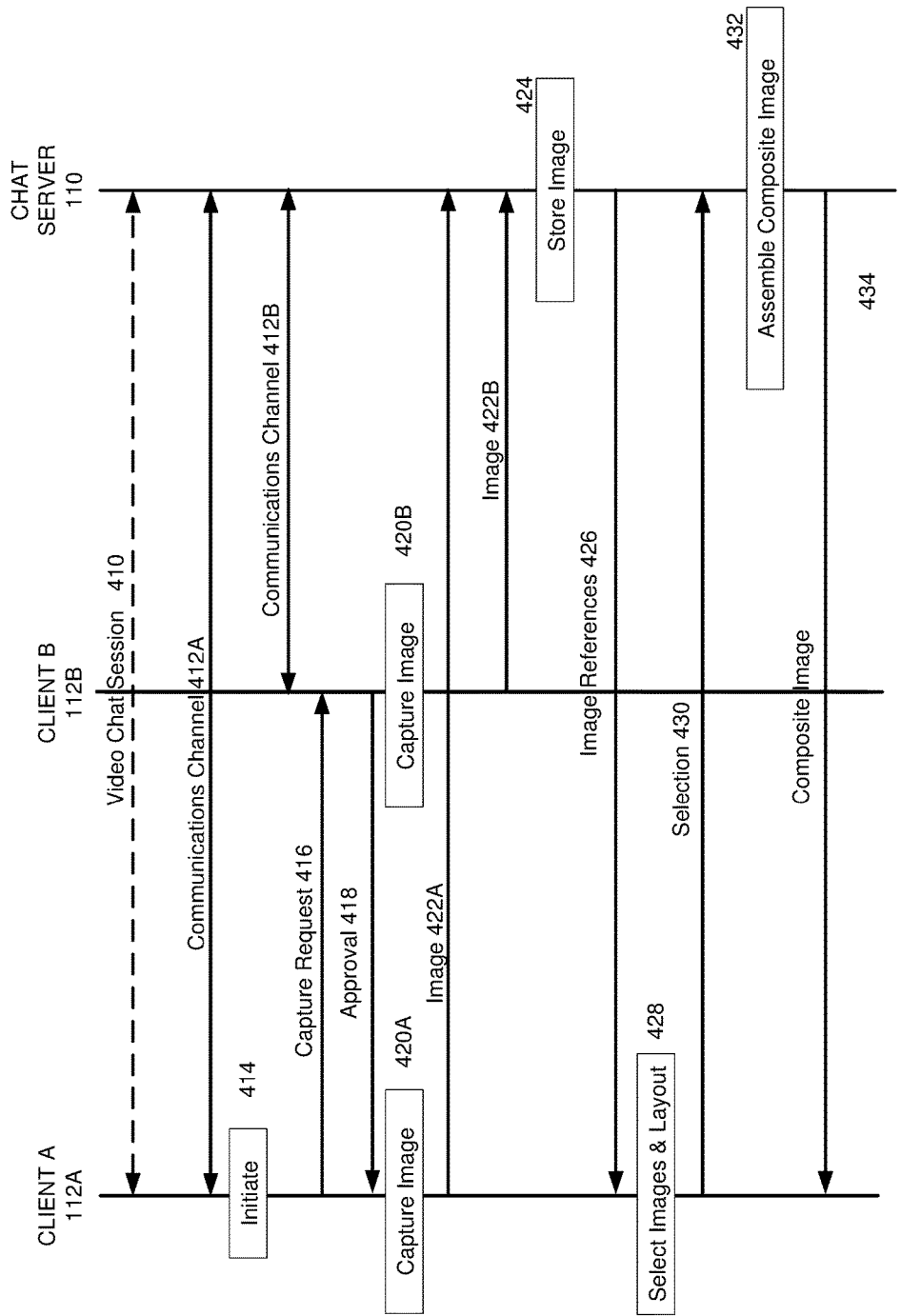
FIG. 4 is a transaction diagram illustrating a method of generating a high-quality composite image according to one embodiment.

FIG. 4 is a transaction diagram illustrating a method of generating a high-quality composite image according to one embodiment. The top of FIG. 4 illustrates two clients, client A 112A and client B 112B, and the chat server 110. An associated vertical line descends from each entity and represents the forward flow of time. Boxes on the vertical lines represent actions performed by the associated entity. Horizontal lines represent interactions between the entities associated with the vertical lines at which the horizontal lines terminate. The actions and interactions illustrated in FIG. 4 represent one embodiment. Other embodiments can have different actions and/or interactions, and the actions and/or interactions may occur in different orders. Additionally, in other embodiments, some actions may be performed in different entities, and the interactions may involve other entities.

Assume that the users of client A 112A and client B 112B are participating 410 in a video chat session. FIG. 4 represents this chat session as a dashed line connecting the clients 112 and the chat server 110. The clients 112 exchange video streams for the chat session. In one embodiment each client 112 provides a stream to the chat server 110, and the chat server distributes the streams to the other clients. In addition, FIG. 4 shows that each client 112 has an out-of-band communications channel 412 with the chat server 110. The communications channel 412 passes over the network 114 and is separate from the video streams. The communications channel 412 may be open and closed by the entities; it does not necessarily persist throughout the interactions described in FIG. 4.

The user of client A 112 initiates 414 generation of a high-quality composite image of the video chat session. Initiating client A 112A sends 416 an activity message to client B 112B requesting that the user of client B participate in the composite image generation process. Client A 112A can send the activity message to the chat server 110, and the server can distribute message to client B 112B. Alternatively, client A 112A can send the activity message directly to client B 112B. The activity message requests that client B 112B capture a high-quality local image. Assuming the user of client B approves the request, client B sends 418 an approval message indicating that the user of client B agrees to participate in the image generation process. In one embodiment, the user of client 112A views the responses from the other chat participants and decide whether to go forward with the composite image generation process. If the user decides to go ahead, the user's client 112A sends a second activity message instructing client B 112B to capture a high-quality local image, either via the server 110 or directly.

The clients 112 each capture 420 high-quality local images based on the activity message. The local images may be captured from the video stream already being generated by the cameras 116 of the clients for the video chat session. Each client 112 may capture one or more images. The clients 112 send 422 the captured images to the chat server 110 via the communications channels. The chat server 110 stores 424 the images in a repository 314. In some embodiments, the images are sent to, and stored by, a separate Upload Service instead of the chat server 110.

The chat server 110 sends 426 references to the images received from the clients 112 to the client 112A of the initiating user via the communications channel. The initiating user's client 112A uses the references to retrieve the images. The user selects 428 the images and the layout to use for the composite image, and the user's client 112A sends the selections to the chat server 110 via the communications channel. The chat server 110 assembles 432 the composite image based on the selections and saves the composite image to the repository 314. The chat server then sends a reference to the composite image to the initiating user's client 112A. The client 112A can use the reference to retrieve the composite image, and the user can view the image, post it to social media, and/or use the image for other purposes. In another embodiment, the initiating user's client 112A assembles 432 the composite image based on the selections and sends the composite image to the chat server 110 for saving in the repository 314.

Figure 5:
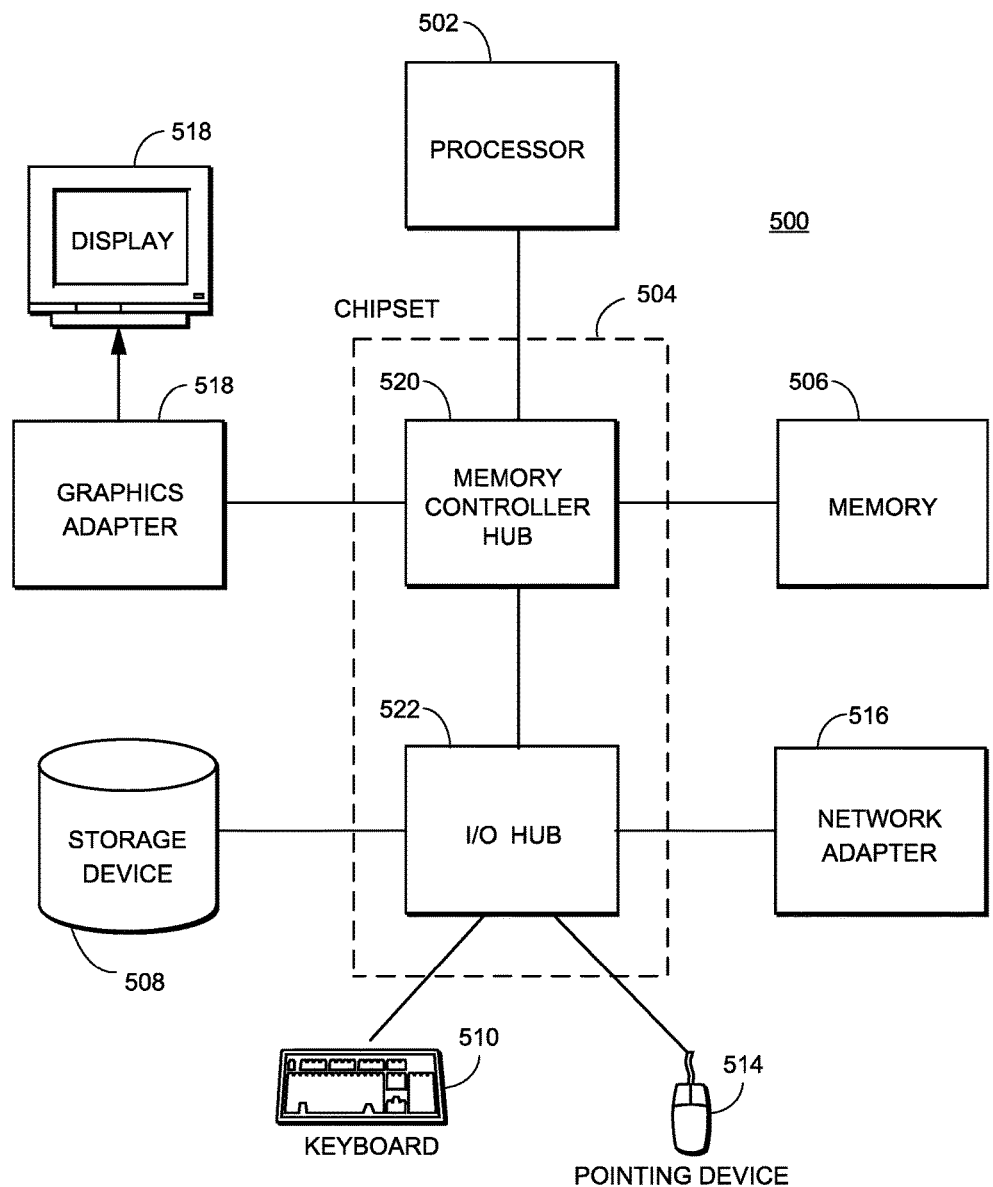
FIG. 5 is a high-level block diagram illustrating physical components of a computer used as part or all of one or more of the entities described herein in one embodiment.

FIG. 5 is a high-level block diagram illustrating physical components of a computer 500 used as part or all of one or more of the entities described herein in one embodiment. For example, instances of the illustrated computer 500 may be used as a client 112 and/or the chat server 110. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O hub 522. In another embodiment, the memory 506 is coupled directly to the processor 502 instead of the chipset 504. In one embodiment, one or more sound devices (e.g., a loudspeaker, audio driver, etc.) is coupled to chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer 500. The graphics adapter 512 displays images and other information on the display 518. The network adapter 516 couples the computer system 500 to a local or wide area network.

As is known in the art, a computer 500 can have different and/or other components than those shown in FIG. 5. In addition, the computer 500 can lack certain illustrated components. In one embodiment, a computer 500 acting as a server may lack a keyboard 510, pointing device 514, graphics adapter 512, and/or display 518. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, from a plurality of clients engaged in a video chat session in which video streams are exchanged, a plurality of local images captured by the plurality of clients engaged in the video chat session, the plurality of local images received out-of-band from the exchanged video streams;
storing the plurality of local images captured by the plurality of clients engaged in the video chat session in an image repository;
providing the plurality of local images from the image repository to at least one client of the plurality of clients; and
receiving, from the at least one client, a selection selecting images from among the plurality of local images;
forming a composite image from the images selected from among the plurality of local images; and
providing the composite image to the at least one client of the plurality of clients engaged in the video chat session.

2. The method of claim 1, further comprising:
distributing an activity message to the plurality of clients engaged in the video chat session, the activity message instructing the plurality of clients to capture the local images at the respective plurality of clients;
wherein the plurality of local images are received responsive to distributing the activity message.

3. The method of claim 2, wherein in response to receiving the activity message a client captures a local image by sampling the local image from a video stream being captured by the client.

4. The method of claim 1, wherein forming the composite image comprises:
receiving, from the at least one client, a selected layout of a plurality of layouts for the composite image; and
combining the plurality of local images according the selected layout to form the composite image.

5. The method of claim 1, further comprising:
storing the composite image in the image repository.

6. The method of claim 1, wherein the plurality of local images are received separately from the exchanged video streams.

7. A non-transitory computer-readable storage medium storing computer program instructions executable by a processor to perform operations comprising:
receiving, from a plurality of clients engaged in a video chat session in which video streams are exchanged, a plurality of local images captured by the plurality of clients engaged in the video chat session, the plurality of local images received out-of-band from the exchanged video streams;
storing the plurality of local images captured by the plurality of clients engaged in the video chat session in an image repository;
providing the plurality of local images from the image repository to at least one client of the plurality of clients; and
receiving, from the at least one client, a selection selecting images from among the plurality of local images;
forming a composite image from the images selected from among the plurality of local images; and
providing the composite image to the at least one client of the plurality of clients engaged in the video chat session.

8. The medium of claim 7, the operations further comprising:
distributing an activity message to the plurality of clients engaged in the video chat session, the activity message instructing the plurality of clients to capture the local images at the respective plurality of clients;
wherein the plurality of local images are received responsive to distributing the activity message.

9. The medium of claim 8, wherein in response to receiving the activity message a client captures a local image by sampling the local image from a video stream being captured by the client.

10. The medium of claim 7, wherein forming the composite image comprises:
receiving, from the at least one client, a selected layout of a plurality of layouts for the composite image; and
combining the plurality of local images according the selected layout to form the composite image.

11. The medium of claim 7, the operations further comprising:
storing the composite image in the image repository.

12. The medium of claim 7, wherein the plurality of local images are received separately from the exchanged video streams.

13. A system comprising:
a computer processor for executing computer program instructions; and
a non-transitory computer-readable storage medium storing computer program instructions executable by the processor to perform operations comprising:
receiving, from a plurality of clients engaged in a video chat session in which video streams are exchanged, a plurality of local images captured by the plurality of clients engaged in the video chat session, the plurality of local images received out-of-band from the exchanged video streams;
storing the plurality of local images captured by the plurality of clients engaged in the video chat session in an image repository;
providing the plurality of local images from the image repository to at least one client of the plurality of clients; and
receiving, from the at least one client, a selection selecting images from among the plurality of local images;
forming a composite image from the images selected from among the plurality of local images; and
providing the composite image to the at least one client of the plurality of clients engaged in the video chat session.

14. The system of claim 13, the operations further comprising:
distributing an activity message to the plurality of clients engaged in the video chat session, the activity message instructing the plurality of clients to capture the local images at the respective plurality of clients;
wherein the plurality of local images are received responsive to distributing the activity message.

15. The system of claim 14, wherein in response to receiving the activity message a client captures a local image by sampling the local image from a video stream being captured by the client.

16. The system of claim 13, wherein forming the composite image comprises:
- receiving, from the at least one client, a selected layout of a plurality of layouts for the composite image; and
- combining the plurality of local images according the selected layout to form the composite image.

17. The system of claim 13, the operations further comprising:
- storing the composite image in the image repository.

\* \* \* \* \*